No. 734,143. PATENTED JULY 21, 1903.
C. F. STACKPOLE.
STAKING MACHINE.
APPLICATION FILED MAR. 11, 1899.
NO MODEL. 2 SHEETS—SHEET 1.
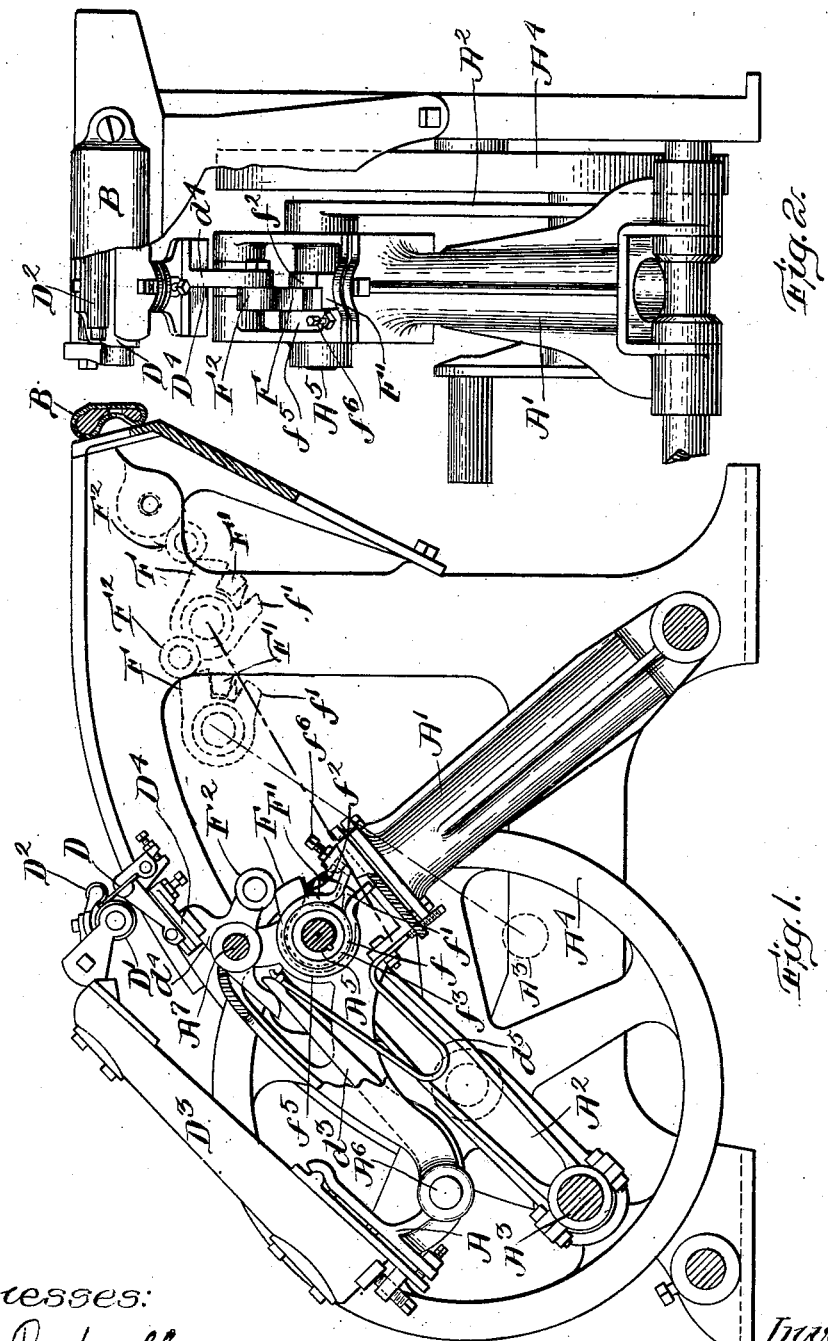
Witnesses:
G. A. Rockwell
C. B. Maynadier
Inventor:
Charles F. Stackpole
by J. E. & Wm. Maynadier
Attorneys

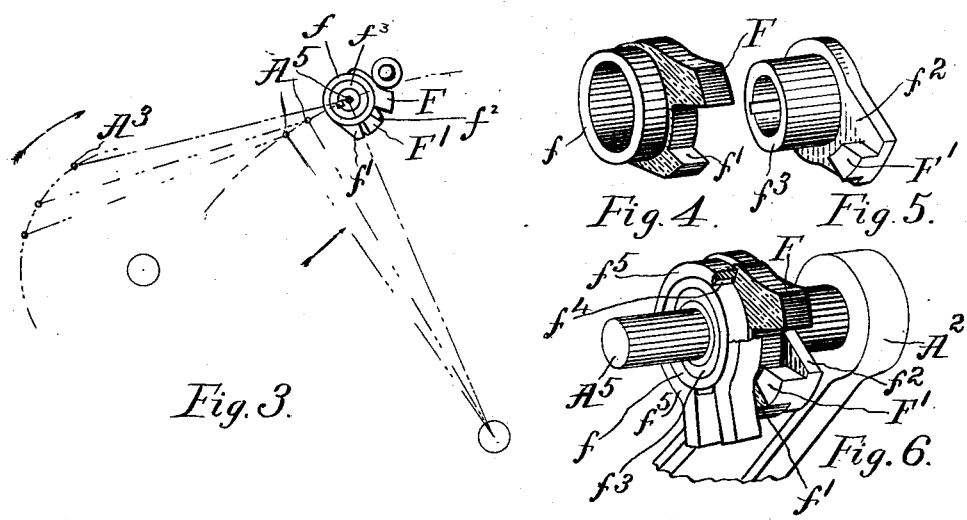

No. 734,143. Patented July 21, 1903.

UNITED STATES PATENT OFFICE.

CHARLES F. STACKPOLE, OF LYNN, MASSACHUSETTS, ASSIGNOR TO WELLMAN SOLE CUTTING MACHINE COMPANY, OF MEDFORD, MASSACHUSETTS, A CORPORATION OF MAINE.

STAKING-MACHINE.

SPECIFICATION forming part of Letters Patent No. 734,143, dated July 21, 1903.

Application filed March 11, 1899. Serial No. 708,664. (No model.)

*To all whom it may concern:*

Be it known that I, CHARLES F. STACKPOLE, of Lynn, in the county of Essex and State of Massachusetts, have invented an Improved Staking-Machine, of which the following is a specification, reference being had to the accompanying drawings, making a part hereof, in which—

Figure 1 is a sectional elevation of one form of my improved staking-machine. Fig. 2 is a front view with portions broken away. Figs. 3, 4, 5, and 6 are details illustrating my new principle, which are more fully described below.

A staking-machine consists of a carriage which reciprocates with relation to a bolster and which carries staking-tools, usually a blade and one or more rolls, and mechanism which causes the blade and rolls to close upon the skin to be staked as the carriage is moved away from the bolster, but causes the blade and rolls to separate as the carriage is moved toward the bolster. One edge of the skin is held by the attendant against the bolster, so that when the carriage moves toward the bolster the blade will be at the under side of the skin and the rolls at the upper side; but as the carriage commences to recede from the bolster the staking-tools will close upon the skin and the motion of the carriage away from the bolster will stake the skin—that is, will have the same effect as if the carriage were stationary and the skin were pulled with force enough to pull it over the blade when folded about that blade by the rolls. When the carriage has made its staking stroke, the blade and rolls are separated, the carriage and the tools are moved forward, the attendant shifts the skin, the tools close again upon the skin, and a new portion of the skin is staked as the carriage and the staking-tools move away from the bolster. All this has long been well known, and staking-machines of this sort have long been in general use, the carriage being often in ways instead of being mounted on a radius-rod, and it is common to reciprocate the carriage by means of a pitman and a crank-pin projecting from a crank-wheel. Moreover, staking-tools, such as shown and of other sorts, mounted on jaws, which jaws are suitably mounted on a carriage and opened and closed by a cam and operated by the angular changes of the pitman, are also familiar to all skilled in the art; but heretofore the cam has been so controlled by the pitman that it was impossible to utilize so much of the stroke of the carriage as is practical with my improved machine.

The object of my invention is to control the cam which separates the staking-tools in the return stroke of the carriage and closes them on the skin on the staking stroke of the carriage by means for increasing the time between the opening and closing action of the cam—that is, to make the cam act to close the jaws at the beginning of a stroke of the carriage in one direction and to open the jaws at the beginning of the next stroke.

My invention relates to staking-machines; and it consists in the combination of a carriage, a pitman, jaws on the carriage, a cam for opening and closing the jaws, and means for regulating the time between the opening and closing action of the cam.

In the drawings, A is a carriage upon which are the staking-tools, consisting of a blade D and rolls D' D².

B is a bolster.

A' is a radius-rod upon which the carriage is mounted.

A² is a pitman connected at one end to pin A⁵ and at the other end to crank-wheel A⁴ by crank-pin A³.

D³ D⁴ are jaws suitably mounted on the carriage and carrying the staking-tools. Jaw D³ is rigidly connected to arm d³ and is pivoted at A⁶ to carriage A. Jaw D³ has a rigid projection which carries rolls D' and D². Jaw D⁴ is rigidly connected to arm d⁴ and is pivoted at A⁷ to the carriage. Spring d⁵ is attached at one end to the carriage and at its free end bears against arm d³.

F is a cam for opening and closing the jaws.

Cam-lug F' is a projection from arm f², which is fast to sleeve f³, and sleeve f³ is fast on pin A⁵, which is fast to pitman A². Cam F is fast to sleeve f, and sleeve f also carries jaw f', the space between jaw f' and the opposed wall of the part constituting cam F being wider than lug F', as will be clear from Fig. 4, which is a perspective of cam F, its sleeve $f$, and jaw $f'$; from Fig. 5, which is a perspective of cam-lug F', its arm $f^2$ and sleeve $f^3$, and from Fig. 6, which is a perspective showing these parts in position. Sleeve $f$ of cam F surrounds sleeve $f^3$ of cam-lug G', and sleeve $f$ is prevented from undesirable motion by a strip of leather $f^4$, which is clamped between sleeve $f$ and clamp $f^5$, as shown in Fig. 6 and also in Fig. 1, where the set-screw $f^6$ is shown which adjusts the friction.

The operation is as follows: It will be seen that when the parts are in the position shown in Fig. 3 the cam-lug F' is engaging jaw $f'$ and is about to move cam F into a position which allows cam-roll $F^2$ to move toward pin $A^5$ of pitman $A^2$, thus allowing jaws $D^3 D^4$ to open under the influence of spring $d^5$ and separate blade D from rolls D' $D^2$—that is, to allow cam F and cam-roll $F^2$ to take the position shown in Fig. 3. Jaws $D^3 D^4$ open when carriage A begins its stroke toward bolster B, and cam F does not move its cam-roll until cam-lug F' has moved back across the space between jaw $f'$ and the opposed wall of the part constituting cam F, when lug F' engages that wall and forces cam F under its cam-roll $F^2$, as illustrated in dotted lines on the right of Fig. 1. This occurs at the end of the stroke of carriage A toward bolster B, and the staking-tools D D' $D^2$ are closed on the skin as carriage A commences its staking stroke away from bolster B. Cam-lug F' continues during the staking stroke of carriage A to engage the rear wall of cam F until it forces cam F well under its cam-roll $F^2$, as shown in broken lines in Fig. 1, and then lug F' moves away from cam F and toward jaw $f'$, which it engages, and moves cam F clear of its cam-roll $F^2$ as carriage A begins its stroke toward bolster B.

What I claim as my invention is—

1. In a staking-machine the combination of a carriage; a pitman for reciprocating it; jaws carried by the carriage; a cam for opening and closing those jaws, and means for regulating the time between the opening and closing action of the cam, substantially as described.

2. In a staking-machine the combination of a cam; a sleeve carrying that cam; a jaw on that sleeve opposed to the part constituting the cam; a second sleeve concentric with the first; a lug on that sleeve projecting into the space between the rear end of the cam and the jaw; a friction device to control the cam-sleeve; a pitman, and a carriage reciprocated by the pitman, substantially as described.

CHARLES F. STACKPOLE.

Witnesses:
HENRIETTA POWERS,
H. P. GUILLO.